US010313872B2

(12) United States Patent
Gao (10) Patent No.: US 10,313,872 B2
(45) Date of Patent: Jun. 4, 2019

(54) IMSI ACQUISITION METHOD AND DEVICE, AND SIGNALING MONITORING SYSTEM (71) Applicant: ZTE CORPORATION, Shenzhen (CN)

(72) Inventor: Zhisen Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 205 days.

(21) Appl. No.: 15/322,305

(22) PCT Filed: May 25, 2015

(86) PCT No.: PCT/CN2015/079710
§ 371 (c)(1),
(2) Date: Apr. 27, 2017

(87) PCT Pub. No.: WO2015/196886
PCT Pub. Date: Dec. 30, 2015

(65) Prior Publication Data
US 2017/0230822 A1 Aug. 10, 2017

(30) Foreign Application Priority Data
Jun. 27, 2014 (CN) .......................... 2014 1 0301530

(51) Int. Cl.
H04M 11/00 (2006.01)
H04W 8/20 (2009.01)
(Continued)

(52) U.S. Cl.
CPC ............ *H04W 8/205* (2013.01); *H04W 8/08* (2013.01); *H04W 24/04* (2013.01); *H04W 8/26* (2013.01);
(Continued)

(58) Field of Classification Search
CPC ................... H04W 4/00; H04W 4/029; H04W 4/06–4/20; H04W 4/24
See application file for complete search history.

(56) References Cited

U.S. PATENT DOCUMENTS

2009/0264097 A1* 10/2009 Cai ........................ G06Q 30/04
455/406
2010/0238887 A1* 9/2010 Koodli .................. H04W 36/32
370/329
(Continued)

FOREIGN PATENT DOCUMENTS

| CN | 103648125 A | 3/2014 |
| CN | 104640107 A | 5/2015 |

OTHER PUBLICATIONS

PCT International Search Report dated Sep. 9, 2015, Application No. PCT/CN2015/079710, 3 Pages.
(Continued)

Primary Examiner — San Htun
(74) Attorney, Agent, or Firm — Plumsea Law Group, LLC (57) ABSTRACT Embodiments of the present disclosure disclose an IMSI acquisition method and device, and a signaling monitoring system. The IMSI acquisition method provided by the embodiment of the present disclosure includes: collecting an S1-MME interface signaling and a first interface signaling which is associated with the S1-MME interface signaling; acquiring a first identity from the S1-MME interface signaling; acquiring an IMSI and a second identity from the first interface signaling, herein the second identity is an identity which is associated with the first identity; associating the first identity, the second identity and the IMSI; and acquiring the corresponding IMSI according to an association result and the first identity in the S1-MME interface signaling.

12 Claims, 6 Drawing Sheets (51) Int. Cl.
*H04W 24/04* (2009.01)
*H04W 8/08* (2009.01)
*H04W 84/04* (2009.01)
*H04W 92/12* (2009.01)
*H04W 8/26* (2009.01)
*H04W 92/04* (2009.01)
*H04W 92/06* (2009.01)

(52) U.S. Cl.
CPC ........ *H04W 84/042* (2013.01); *H04W 92/045* (2013.01); *H04W 92/06* (2013.01); *H04W 92/12* (2013.01)

(56) References Cited

U.S. PATENT DOCUMENTS

| | | | |
|---|---|---|---|
| 2011/0103310 A1* | 5/2011 | Stojanovski | H04L 12/66 370/328 |
| 2012/0155324 A1* | 6/2012 | Janakiraman | H04L 41/12 370/254 |
| 2012/0159151 A1 | 6/2012 | Janakiraman et al. | |
| 2013/0039244 A1* | 2/2013 | Sun | H04W 52/0235 370/311 |
| 2014/0003333 A1* | 1/2014 | Ivershen | H04W 24/08 370/328 |
| 2014/0192780 A1* | 7/2014 | Kim | H04W 48/08 370/331 |
| 2015/0063113 A1* | 3/2015 | Yoshida | H04L 45/38 370/235 |

OTHER PUBLICATIONS

PCT Written Opinion of the International Searching Authority dated Sep. 9, 2015, Application No. PCT/CN2015/079710, Applicant ZTE Corporation, 4 Pages.

* cited by examiner

| Number | Subscriber identity | Temporary identity | Downlink channel point | Uplink channel point | Session state |
|---|---|---|---|---|---|
| 1 | IMSI | | | F-TEID | Attached |

FIG. 9

| Number | Subscriber identity | Temporary identity | Downlink channel point | Uplink channel point | Session state |
|---|---|---|---|---|---|
| 1 | IMSI | GUTI | | F-TEID | Attached |

FIG. 10

| Number | Subscriber identity | Temporary identity | Downlink channel point | Uplink channel point | Session state |
|---|---|---|---|---|---|
| 1 | IMSI | GUTI | F-TEID | F-TEID | Attached | though user terminals are powered off and detached. Suppos-

IMSI ACQUISITION METHOD AND DEVICE, AND SIGNALING MONITORING SYSTEM

CROSS-REFERENCE TO RELATED APPLICATIONS

This application is a U.S. national phase of PCT Application No. PCT/CN2015/079710 filed on May 25, 2015, which claims priority to Chinese Patent Application No. 201410301530.X filed on Jun. 27, 2014, the disclosures of which are incorporated in their entirety by reference herein.

TECHNICAL FIELD

The present disclosure relates to the field of mobile communication, in particular to an International Mobile Subscriber Identity IMSI acquisition method and device, and a signaling monitoring system.

BACKGROUND

With the increase of mobile communication demands of people and the development of technology, quality and efficiency of 2/3G communication networks have been incapable of satisfying the demands of people. Therefore, 4G-LTE networks are gradually started to be applied. During LTE network deployment, low network quality and poor stability are caused by instable or defective devices or terminals. Thus, operators urgently need a signaling monitoring system which can monitor and assess primary devices to facilitate the quality improvement of networks.

In a Long Term Evolution LTE network, an S1-MME interface is an interface between an eNodeB (evolved NodeB, also called as a base station) to an EPC (Evolved Packet Core) MME (Mobility Management Entity), and is an associated node from a wireless access network to a core network. The signaling monitoring system of the S1-MME interface plays an important role in monitoring and guaranteeing the quality and stability of the wireless network and the core network of LTE and interaction processes therebetween.

In consideration of air interface security, subscriber identities International Mobile Subscriber Identities IMSIs are prevented from being directly transmitted as much as possible in S1-MME interface signaling and will be replaced with temporary subscriber identities Globally Unique Temporary UE Identities GUTIs in a signaling process. However, GUTIs are temporary identities, and will be allocated to different subscribers again and cannot directly correspond to subscribers, resulting that bills generated by the S1-MME interface signaling monitoring system frequently lack IMSIs, and cannot be directly associated to subscribers. Therefore, use demands of operators cannot be satisfied. Specifically, in signaling of an S1-MME interface, basically temporary subscriber identities are always used and final subscriber identities IMSIs are not used. MMEs store IMSI information as it is received for once, GUTIs will be used in subsequent processes and the IMSI information will be saved for a very long time even though user terminals are powered off and detached. Supposing that a user terminal is always in a same base station area in one month, i.e., is located on a same MME, all S1-MME interface signaling processes of the terminal in one month will only use GUTIs and do not carry an IMSI. Only when the IMSI at the MME does not exist, signaling for requesting the IMSI is initiated once. Once the IMSI is acquired again, subsequent processes continuously use GUTIs. Only in special scenarios that the terminal is powered on for the first time, and the terminal is switched between different MMEs and the terminal is powered off for many days, there is no IMSI information at the MME. These scenarios rarely occur and temporary identities GUTIs are always used in subsequent processes after any one of these scenarios occurs once. That causes that the IMSI cannot be acquired from most signaling processes of the S1-MME interface. As a result, bills generated by the S1-MME interface signaling monitoring system frequently lack IMSIs and cannot be directly associated to subscribers.

SUMMARY

The embodiments of the present disclosure provide an IMSI acquisition method and device, and a signaling monitoring system, to solve the problem that an IMSI cannot be acquired from most signaling processes of an S1-MME interface at present.

An embodiment of the present disclosure provides an IMSI acquisition method, including the following steps:

collecting an S1-MME interface signaling and a first interface signaling which is associated with the S1-MME interface signaling;

acquiring a first identity from the S1-MME interface signaling;

acquiring an IMSI and a second identity from the first interface signaling, herein the second identity is an identity which is associated with the first identity;

associating the first identity, the second identity and the IMSI; and acquiring the corresponding IMSI according to an association result and the first identity in the S1-MME interface signaling.

In an exemplary embodiment, the step of associating the first identity, the second identity and the IMSI includes: associating the first identity, the second identity and the IMSI to generate a subscriber identity table; and the step of acquiring the corresponding IMSI according to an association result and the first identity in the S1-MME interface signaling includes: querying the subscriber identity table according to the first identity in the S1-MME interface signaling to obtain the corresponding IMSI.

In an exemplary embodiment, the first identity includes a GUTI and/or a third identity.

In an exemplary embodiment, when the first identity includes the GUTI and the third identity or the third identity, the second identity and the third identity are a same identity carried by the S1-MME interface signaling and the first interface signaling.

In an exemplary embodiment, the first interface signaling which is associated with the S1-MME interface signaling includes an S11 interface signaling; and the second identity and the third identity include at least one of uplink Fully Qualified Tunnel Endpoint Identifier F-TEID and downlink F-TEID.

In an exemplary embodiment, when the first identity includes the GUTI, the first identity and the second identity are a same GUTI carried by the S1-MME interface signaling and the first interface signaling.

In an exemplary embodiment, the first interface signaling which is associated with the S1-MME interface signaling includes an S10 interface signaling.

Also in order to solve the above-mentioned technical problem, the embodiment of the present disclosure further provides an IMSI acquisition device, including: a collection module, a first acquisition module, a second acquisition module, a subscriber identity association module and an IMSI acquisition module, herein:

the collection module is arranged to collect an S1-MME interface signaling and a first interface signaling which is associated with the S1-MME interface signaling;

the first acquisition module is arranged to acquire a first identity from the S1-MME interface signaling;

the second acquisition module is arranged to acquire an IMSI and a second identity from the first interface signaling, herein the second identity is an identity which is associated with the first identity;

the subscriber identity association module is arranged to associate the first identity, the second identity and the IMSI; and the IMSI acquisition module is arranged to acquire the corresponding IMSI according to an association result and the first identity in the S1-MME interface signaling.

In an exemplary embodiment, the subscriber identity association module is arranged to associate the first identity, the second identity and the IMSI to generate a subscriber identity table; and the IMSI acquisition module is arranged to query the subscriber identity table according to the first identity in the S1-MME interface signaling to obtain the corresponding IMSI.

In an exemplary embodiment, the first identity includes a GUTI and/or a third identity.

In an exemplary embodiment, when the first identity includes the GUTI and the third identity or the third identity, the second identity and the third identity are a same identity carried by the S1-MME interface signaling and the first interface signaling.

In an exemplary embodiment, the first interface signaling which is associated with the S1-MME interface signaling includes an S11 interface signaling; and the second identity and the third identity include at least one of uplink F-TEID and downlink F-TEID.

In an exemplary embodiment, the first identity includes the GUTI and the first interface signaling which is associated with the S1-MME interface signaling includes an S10 interface signaling; and the second identity and the GUTI are a same GUTI carried by the S1-MME interface signaling and the first interface signaling.

Also to solve the above-mentioned technical problem and further solve the problem that a bill lacks for an IMSI, an embodiment of the present disclosure further provides a signaling monitoring system, including: a data access module, an interface protocol identification module, an S1-MME interface signaling monitoring and analysis module, a first interface subscriber identity acquisition module, a subscriber identity association module and a bill sending module, herein:

the data access module is arranged to collect an S1-MME interface data packet and a first interface data packet, herein the first interface data packet is a data packet of a first interface which is associated with an S1-MME interface;

the interface protocol identification module is arranged to process the collected data packets, send the S1-MME interface data packet to the S1-MME interface signaling monitoring and analysis module and send the first interface data packet to the first interface subscriber identity acquisition module;

the S1-MME interface signaling monitoring and analysis module is arranged to extract an S1-MME interface signaling from the S1-MME interface data packet and process the S1-MME interface signaling to generate an S1-MME interface signaling bill; acquire a GUTI and a first identity from the S1-MME interface signaling; and acquire a corresponding IMSI according to an association result of the subscriber identity association module and the first identity in the S1-MME interface signaling, and backfill the IMSI into the S1-MME interface signaling bill;

the first interface subscriber identity acquisition module is arranged to extract a first interface signaling from the first interface data packet and acquire an IMSI and a second identity from the first interface signaling, herein the second identity is an identity which is associated with the first identity;

the subscriber identity association module is arranged to associate the first identity, the second identity and the IMSI; and the bill sending module is arranged to send the backfilled S1-MME interface signaling bill to an upper-level system.

In an exemplary embodiment, the subscriber identity association module is arranged to associate the first identity, the second identity and the IMSI to generate a subscriber identity table; and the S1-MME interface signaling monitoring and analysis module is arranged to query the subscriber identity table according to the first identity in the S1-MME interface signaling to obtain the corresponding IMSI.

In an exemplary embodiment, the first identity includes a GUTI and/or a third identity.

In an exemplary embodiment, when the first identity includes the GUTI and the third identity or the third identity, the second identity and the third identity are a same identity carried by the S1-MME interface signaling and the first interface signaling.

In an exemplary embodiment, the first interface signaling which is associated with the S1-MME interface signaling includes an S11 interface signaling; and the second identity and the third identity include at least one of uplink F-TEID and downlink F-TEID.

By adopting the IMSI acquisition method and device and the signaling monitoring system provided by the embodiments of the present disclosure, an IMSI corresponding to S1-MME interface signaling can be acquired, and thereby the subscriber identity IMSI can be added into an S1-MME interface signaling bill to associate a subscriber. The IMSI acquisition method provided by the embodiment of the present disclosure includes: collecting an S1-MME interface signaling and a first interface signaling which is associated with the S1-MME interface signaling; acquiring a first identity from the S1-MME interface signaling; acquiring an IMSI and a second identity from the first interface signaling, herein the second identity is an identity which is associated with the first identity; associating the first identity, the second identity and the IMSI; and acquiring the corresponding IMSI according to an association result and the first identity in the S1-MME interface signaling. Since the IMSI acquisition method provided by the embodiment of the present disclosure uses the feature that the S1-MME interface signaling and the first interface signaling carrying the IMSI have the associated identities, and identities corresponding to two interface signaling are associated, the IMSI can be directly acquired by using the first identity in the S1-MME interface signaling. Compared with the related art, by adopting the method provided by the embodiment of the present disclosure, the subscriber identity IMSI corresponding to the S1-MME interface signaling can be completely acquired, the IMSI can be provided for the signaling monitoring bill, thereby the signaling monitoring bill can be associated with the subscriber and the user experience is improved.

SPECIFIC EMBODIMENTS

The embodiments of the present disclosure will be described below in detail with reference to the drawings.

Embodiment 1

Figure 1:
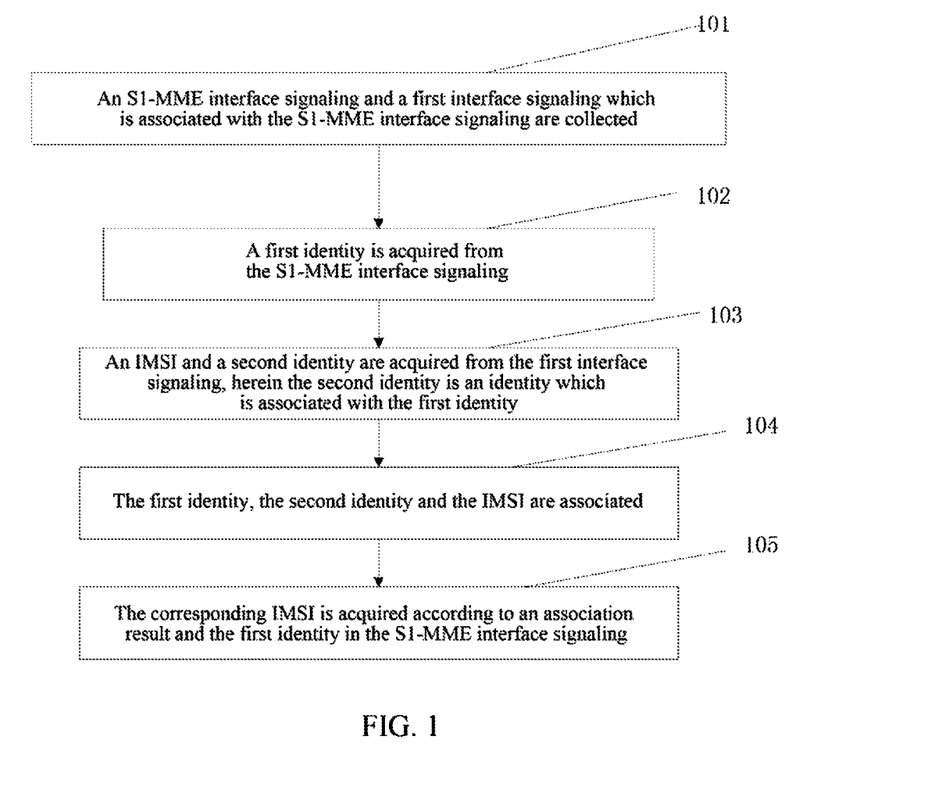
FIG. 1 illustrates a flowchart of an IMSI acquisition method provided by embodiment 1 of the present disclosure.

In consideration of the problem that an IMSI cannot be acquired from an S1-MME interface signaling process at present and the problem that an S1-MME interface signaling bill lacks the IMSI and cannot be associated with a subscriber because the IMSI cannot be acquired from the S1-MME interface signaling process, as illustrated in FIG. 1, the embodiment provides an IMSI acquisition method, which is applied to an LTE network and includes the following steps.

In step 101, S1-MME interface signaling and first interface signaling which is associated with the S1-MME interface signaling are collected.

The S1-MME interface signaling in the embodiment is signaling of an S1-MME interface. The first interface signaling which is associated with the S1-MME interface signaling in the embodiment is signaling of an interface which is associated with the S1-MME interface. Herein the interface which is associated with the S1-MME interface includes a signaling interface which correspondingly triggers another interface signaling process at the same time when triggering an S1-MME interface signaling process, or a signaling interface which can trigger the S1-MME interface signaling process, and the signaling process of the interface and the S1-MME interface signaling process carry associated identities. For example, the interface which is associated with the S1-MME interface may include an S11 interface or an S10 interface.

Generally, when a signaling process of the S1-MME interface is triggered, a corresponding signaling process on an S11 or S10 interface will be triggered; or when a signaling process of an S11 or S10 interface is triggered, an S1-MME interface signaling process will also be triggered. At the moment, the S1-MME interface signaling and the S11 interface signaling carry a same S1-U bearer channel identity, e.g., a downlink F-TEID (i.e., downlink GTP-TEID, IP) and an uplink F-TEID (i.e., uplink GTP-TEID, IP); or the S1-MME interface signaling and the S10 interface signaling carry a same GUTI.

In step 102, a first identity is acquired from the S1-MME interface signaling.

The first identity in the embodiment is an identity which is associated with a second identity carried by the first interface signaling. Herein, association includes that the two identities are the same or the two identities have a corresponding relationship. For example, when the first interface is an S11 interface, the first identity may include at least one of uplink F-TEID and downlink F-TEID.

The first identity in the embodiment is an identity carried by the S1-MME interface signaling and may include a GUTI and/or third identity. For example, the first identity may include the GUTI and the uplink F-TEID, or the GUTI, or the uplink F-TEID, etc. In the embodiment, when the first identity includes the GUTI and/or the third identity, the GUTI may be an identity which is associated with the second identity, or the third identity may be an identity which is associated with the second identity, or the GUTI and the third identity are both identities which are associated with the second identity.

In step 103, an IMSI and the second identity are acquired from the first interface signaling, herein the second identity is an identity which is associated with the first identity.

The second identity in the embodiment is an identity which is associated with the first identity carried by the S1-MME interface signaling. In an exemplary embodiment, when the first identity includes the GUTI and the third identity or the third identity, the second identity and the third identity are a same identity carried by the S1-MME interface signaling and the first interface signaling. For example, when the first interface is the S11 interface, the second identity and the third identity may include at least one of uplink F-TEID and downlink F-TEID.

Of course, the second identity in the embodiment may also be an identity having a corresponding relationship with the first identity. When the first identity includes the GUTI and the third identity or the third identity, the second identity is an identity which has a corresponding relationship with the third identity. When the first identity includes the GUTI, the second identity may be an identity which has a corresponding relationship with the GUTI.

In step 104, the first identity, the second identity and the IMSI are associated.

After identities are respectively acquired from two types of interface signaling, these identities are associated. Since the first identity and the second identity are identities which are associated, an association may be established between the identities in the two signaling and thereby the corresponding IMSI may be acquired from an association result according to the first identity in the S1-MME interface signaling.

The method provided by the embodiment may also maintenance the association result according to a new signaling process, including creation, update and deletion of association.

In step 105, the corresponding IMSI is acquired according to an association result and the first identity in the S1-MME interface signaling.

For example, when the first identity includes the GUTI and the third identity, the corresponding IMSI may be acquired from the association result by using the GUTI or the third identity.

The step 102 and step 103 in the method provided by the embodiment are not strictly limited in sequence, and the step 102 may be executed before or after the step 103 or may be executed at the same time when step 103 is executed.

The S1-MME interface is an important interface for analysis performed by a signaling analysis system. However, since the S1-MME interface basically does not carry the IMSI, it needs to be associated with another first interface carrying the IMSI. When the IMSI is acquired, then the IMSI is backfilled into the S1-MME interface, such that data analyzed on the S1-MME interface all know a subscriber to which the IMSI belongs.

Since the IMSI acquisition method provided by the embodiment uses the feature that different signalings have the associated identities, and associates identities in two signalings, the corresponding IMSI can be acquired by using the identity carried by one interface signaling. For example, the method provided by the embodiment associates the first identity in the S1-MME interface signaling, the IMSI in the first interface signaling and the second identity. Herein, the first identity and the second identity are associated identities, and thereby the corresponding IMSI may be acquired from the association result by using the first identity in the S1-MME interface signaling only. Compared with the related art, by adopting the method provided by the embodiment, the subscriber identity IMSI corresponding to the S1-MME interface signaling can be completely acquired, thereby the signaling monitoring bill have the IMSI and can be associated with the subscriber, and the user experience is improved.

In the method provided by the embodiment, the subscriber identities in two signalings may be associated to establish a subscriber identity table for querying for the IMSI. Therefore, the step 104 may include the following operation: the first identity, the second identity and the IMSI are associated to generate a subscriber identity table. At the moment, the step 105 may include the following operation: the subscriber identity table is queried according to the first identity in the S1-MME interface signaling to obtain the corresponding IMSI.

In the method provided by the embodiment, the subscriber identity table may be established for a subscriber or device to query for the IMSI corresponding to the S1-MME interface signaling, herein the subscriber identity table is a table which indicates a corresponding relationship among the first identity, the second identity and the IMSI.

The method provided by the embodiment may have the following situations due to that contents in the first identity are different:

1. When the first identity includes the GUTI and the third identity, at the moment the second identity and the third identity may be a same identity carried by the S1-MME interface signaling and the first interface signaling. For example, when the first interface is an S11 interface, the second identity and the third identity may include at least one of uplink F-TEID and downlink F-TEID.

After the identities are acquired, the GUTI, the third identity, the second identity and the IMSI are associated to generate a subscriber identity table. The corresponding IMSI is acquired by querying the subscriber identity table according to the GUTI or the third identity.

2. When the first identity includes the GUTI, at the moment the first identity and the second identity are a same GUTI carried by the S1-MME interface signaling and the first interface signaling. In other words, the same GUTI carried by the first interface signaling and the S1-MME interface signaling is respectively extracted. For example, when the first interface is an S10 interface, the first identity and the second identity are a same GUTI carried by the S1-MME interface signaling and S10 signaling.

After the identities are acquired, the GUTI, the second identity and the IMSI are associated to generate a subscriber identity table. The corresponding IMSI is acquired by querying the subscriber identity table according to the GUTI.

3. When the first identity includes the third identity, at the moment the third identity is an identity which is the same as the second identity. For example, when the first interface is an S11 interface, the second identity and the third identity may be at least one of uplink F-TEID and downlink F-TEID.

After the identities are acquired, the third identity, the second identity and the IMSI are associated to generate a subscriber identity table. The corresponding IMSI is acquired by querying the subscriber identity table according to the third identity.

Figure 2:
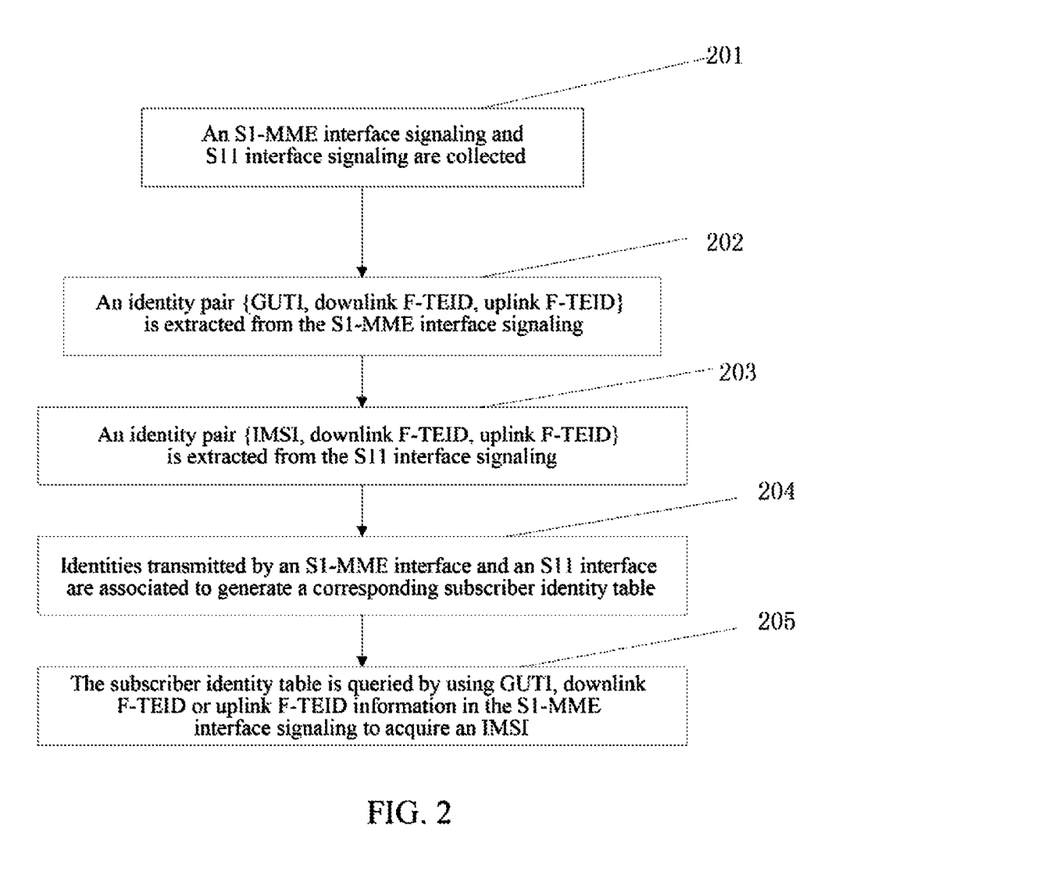
FIG. 2 illustrates a flowchart of another IMSI acquisition method provided by embodiment 1 of the present disclosure.

The method provided by the embodiment will be described below in detail taking that the first interface is an S11 interface and the first identity includes the GUTI, the uplink F-TEID and the downlink F-TEID as an example. Herein, the uplink F-TEID and the downlink F-TEID are the third identity. As illustrated in FIG. 2, the method includes the following steps.

In step 201, an S1-MME interface signaling and S11 interface signaling are collected.

In step 202, an identity pair {GUTI, downlink F-TEID, uplink F-TEID} is extracted from the S1-MME interface signaling.

In step 203, an identity pair {IMSI, downlink F-TEID, uplink F-TEID} is extracted from the S11 interface signaling.

In step 204, identities transmitted by an S1-MME interface and an S11 interface are associated to generate a corresponding subscriber identity table.

In step 205, the subscriber identity table is queried by using GUTI, or downlink F-TEID or uplink F-TEID information in the S1-MME interface signaling to acquire an IMSI.

Similarly, when the first interface is an S10 interface, the process of acquiring the IMSI is similar to the process of acquiring the IMSI when the first interface is an S11 interface, and thus is not repetitively described here.

The method provided by the embodiment puts forward to acquire a subscriber IMSI by using a mode of associating keywords of S1-MME interface and S11 interface. In a signaling process at the S1-MME interface, a corresponding signaling process will be triggered at the S11 interface. The S1-MME interface signaling process will carry a GUTI. A GTP signaling process of the S11 interface will carry an IMSI. In addition, a subscriber carries a same S1-U bearer channel identity, e.g., a downlink F-TEID (i.e., downlink GTP-TEID, IP) and an uplink F-TEID (i.e., uplink GTP-TEID, IP) in the S1-MME interface signaling and the S11 interface signaling. In the method provided by the embodiment, the IMSI and the uplink and downlink F-TEIDs are collected from the S11 interface signaling; and the GUTI and the uplink and downlink F-TEIDs are collected from the S1-MME interface signaling; and then association is performed to establish the subscriber identity table and finally the subscriber identity table is queried by using the GUTI or the uplink and downlink F-TEIDs in the S1-MME interface signaling to acquire the IMSI.

In addition, the method provided by the embodiment may acquire a subscriber IMSI by using a mode of associating keywords of S1-MME interface and S10 interface. A signaling process at the S1-MME interface will trigger a corresponding signaling process at the S10 interface. The S10 interface signaling process will carry an IMSI and carry a same GUTI carried by the S1-MME interface signaling. In the method provided by the embodiment, the GUTI and the IMSI may be collected from the S10 interface signaling, and the GUTI is collected from the S1-MME interface signaling, then association is performed to establish the subscriber identity table and finally the subscriber identity table is queried by using the GUTI in the S1-MME interface signaling to acquire the IMSI.

On the basis of the method provided by the embodiment, the acquired IMSI may also be backfilled into bills such that S1-MME interface bills all have the IMSI and are directly associated to the subscriber.

Embodiment 2

Figure 3:
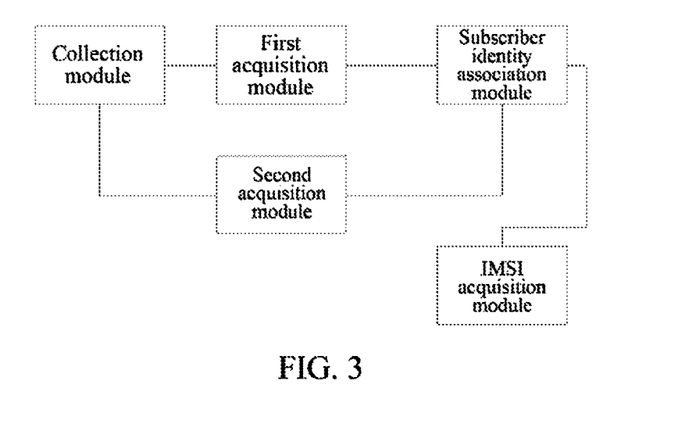
FIG. 3 illustrates a structural schematic diagram of an IMSI acquisition device provided by embodiment 2 of the present disclosure.
Figure 4:
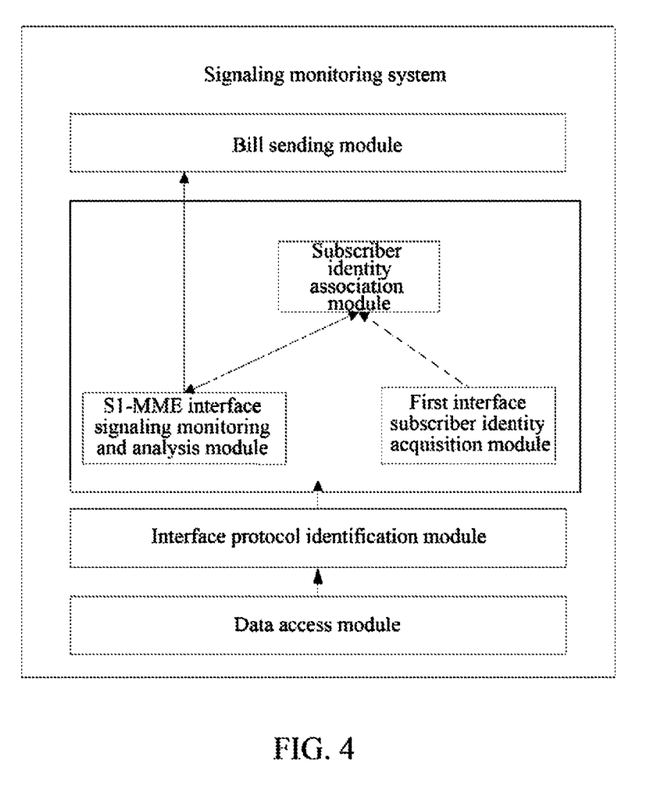
FIG. 4 illustrates a structural schematic diagram of a signaling monitoring system provided by embodiment 3 of the present disclosure.

As illustrated in FIG. 3, to solve the problem that an IMSI cannot be acquired from an S1-MME interface signaling process, the embodiment provides an IMIS acquisition device, including: a collection module, a first acquisition module, a second acquisition module, a subscriber identity association module and an IMSI acquisition module. Herein:

The collection module is arranged to collect an S1-MME interface signaling and a first interface signaling which is associated with the S1-MME interface signaling.

The first acquisition module is arranged to acquire a first identity from the S1-MME interface signaling.

The second acquisition module is arranged to acquire an IMSI and the second identity from the first interface signaling, herein the second identity is an identity which is associated with the first identity.

The subscriber identity association module is arranged to associate the first identity, the second identity and the IMSI.

The IMSI acquisition module is arranged to acquire the corresponding IMSI according to an association result and the first identity in the S1-MME interface signaling.

Since the IMSI acquisition device provided by the embodiment of the present disclosure uses the feature that the S1-MME interface signaling and the first interface signaling carrying the IMSI have the associated identities to associate identities corresponding to two interface signalings, the IMSI can be directly acquired by using the first identity in the S1-MME interface signaling. Compared with the related art, by adopting the device provided by the embodiment of the present disclosure, the subscriber identity IMSI corresponding to the S1-MME interface signaling can be completely acquired, therefore, the IMSI can be provided for the signaling monitoring bill, and the signaling monitoring bill can be associated with the subscriber and the user experience is improved.

On the basis of the IMSI acquisition device, the embodiment further provides an improved solution that: the subscriber identity association module is arranged to associate the first identity, the second identity and the IMSI to generate a subscriber identity table; and the IMSI acquisition module is arranged to query the subscriber identity table according to the first identity in the S1-MME interface signaling to obtain the corresponding IMSI.

In the device provided by the embodiment, the subscriber identity association module is arranged to associate identities of the S1-MME interface and the first interface to generate a subscriber identity table for querying for the IMSI.

In an exemplary embodiment, in the embodiment, the first identity includes a GUTI and/or a third identity.

In an exemplary embodiment, in the embodiment, when the first identity includes the GUTI and the third identity or the third identity; the second identity and the third identity are a same identity carried by the S1-MME interface signaling and the first interface signaling.

In an exemplary embodiment, the first interface signaling which is associated with the S1-MME interface signaling includes S11 interface signaling; and the second identity and the third identity include at least one of uplink F-TEID and downlink F-TEID.

In an exemplary embodiment, in the embodiment, the first identity includes the GUTI and the first interface signaling which is associated with the S1-MME interface signaling includes S10 interface signaling; and the second identity and the GUTI are a same GUTI carried by the S1-MME interface signaling and the first interface signaling.

By using the IMSI acquisition device provided by the embodiment, the IMSI corresponding to the S1-MME interface signaling process can be acquired, therefore, the IMSI is provided for the signaling monitoring bill, thereby the signaling monitoring bill can be associated with the subscriber and the user experience is improved.

Embodiment 3

To solve the problem that a bill generated by an S1-MME interface signaling monitoring system lacks for an IMSI and bill information is not complete because a signaling monitoring system cannot acquire the IMSI from an S1-MME interface signaling process at present, the embodiment provides a signaling monitoring system, including: a data access module, an interface protocol identification module, an S1-MME interface signaling monitoring and analysis module, a first interface subscriber identity acquisition module, a subscriber identity association module and a bill sending module. Herein:

The data access module is arranged to collect an S1-MME interface data packet and a first interface data packet. Herein, the first interface data packet is a data packet of a first interface which is associated with an S1-MME interface.

The interface protocol identification module is arranged to process the collected data packets, send the S1-MME interface data packet to the S1-MME interface signaling monitoring and analysis module and send the first interface data packet to the first interface subscriber identity acquisition module.

The S1-MME interface signaling monitoring and analysis module is arranged to extract the S1-MME interface signaling from the S1-MME interface data packet and process the S1-MME interface signaling to generate an S1-MME interface signaling bill; and acquire a GUTI and a first identity from the S1-MME interface signaling; and acquire a corresponding IMSI according to an association result of the subscriber identity association module and the first identity in the S1-MME interface signaling, and backfill the IMSI into the S1-MME interface signaling bill.

The first interface subscriber identity acquisition module is arranged to extract a first interface signaling from the first interface data packet and acquire an IMSI and the second identity from the first interface signaling. The second identity is an identity which is associated with the first identity.

The subscriber identity association module is arranged to associate the first identity, the second identity and the IMSI.

The bill sending module is arranged to send the backfilled S1-MME interface signaling bill to an upper-level system.

The signaling monitoring system provided by the embodiment can completely acquire subscriber identity IMSI information and backfill the acquired IMSI into the generated bill, such that the signaling monitoring bill has the subscriber identity.

On the basis of the signaling monitoring system, the embodiment provides an improved solution that: the subscriber identity association module is arranged to associate the first identity, the second identity and the IMSI to generate a subscriber identity table; and the S1-MME interface signaling monitoring and analysis module is arranged to query the subscriber identity table according to the first identity in the S1-MME interface signaling to obtain the corresponding IMSI.

The signaling monitoring system provided by the embodiment can acquire the IMSI by generating the subscriber identity table and then querying the table.

On the basis of the signaling monitoring system, in an exemplary embodiment, the first identity includes a GUTI and/or a third identity.

When the first identity includes the GUTI and the third identity or the third identity, the second identity and the third identity are a same identity carried by the S1-MME interface signaling and the first interface signaling. At the moment, the first interface may be an S11 interface and the first interface signaling is an S11 interface signaling, herein the second identity and the third identity include at least one of uplink F-TEID and downlink F-TEID.

The signaling monitoring system provided by the embodiment may collect the GUTI in the S1-MME interface signaling and the same identity carried by the first interface signaling, collect the IMSI in the first interface signaling and the same identity carried by the S1-MME interface signaling, and then associate the collected identities to generate a subscriber identity table for querying the IMSI.

When the first identity includes the GUTI, the first identity and the second identity are a same GUTI carried by the S1-MME interface signaling and the first interface signaling. At the moment, the first interface may be an S10 interface and the first interface signaling is the S10 signaling, herein the second identity and the first identity are both GUTI.

The signaling monitoring system provided by the embodiment may collect the GUTI in the S1-MME interface signaling, and collect the IMSI in the first interface signaling and the same GUTI carried by the S1-MME interface signaling, and then associate the collected identities to generate a subscriber identity table for querying the IMSI.

Figure 5:
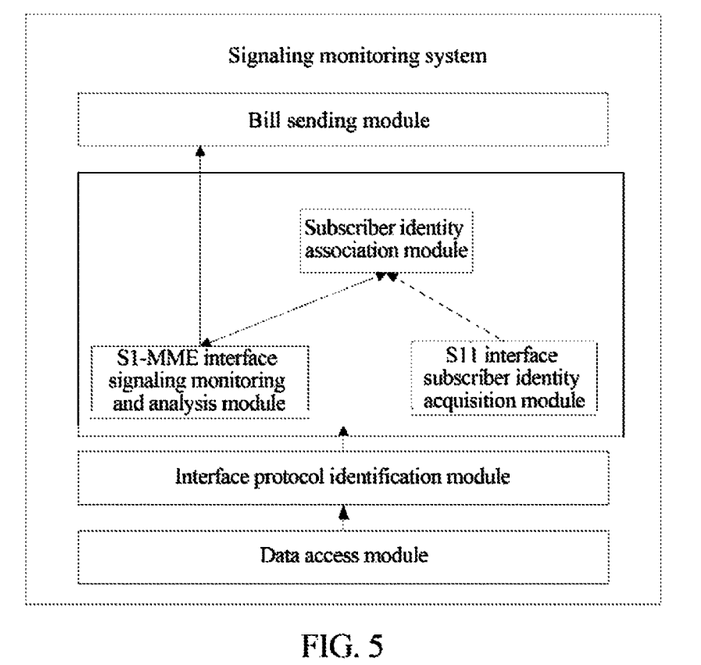
FIG. 5 illustrates a structural schematic diagram of another signaling monitoring system provided by embodiment 3 of the present disclosure.

A process that the signaling monitoring system in the embodiment acquires an IMSI will be introduced below taking that the first interface is an S11 interface as an example. As illustrated in FIG. 5, in the signaling monitoring system in the embodiment, the first interface subscriber identity acquisition module is an S11 interface subscriber identity acquisition module. The process includes the following steps:

In step 1, a data access module collects S1-MME interface and S11 interface data packets and transmits the data packets to an interface protocol identification module.

In step 2, the interface protocol identification module performs protocol decoding on the collected data packets, performs address port and protocol matching, judges an interface type and a protocol layer of each packet, and transmits the data packets to corresponding interface processing modules, i.e., transmits the data packets to an S1-MME interface signaling monitoring and analysis module or an S11 interface subscriber identifier acquisition module.

In step 3, the S1-MME interface signaling monitoring and analysis module is the core of the system, receives the S1-MME interface data packet and performs parsing, process matching and bill generation on signaling of an S1-MME interface; and simultaneously acquires an IMSI, GUTI, downlink F-TEID and uplink F-TEID identity pair in the signaling (there is no IMSI in most scenarios) to transmit to a subscriber identity association module, and queries for the IMSI from the associated module to acquire the IMSI, and backfills the IMSI into a bill of the S1-MME interface.

In step 4, an S11 interface subscriber identity acquisition module receives the S11 interface data packet, performs decryption analysis on GTP-C signaling only, and acquires an IMSI, downlink F-TEID and uplink F-TEID identity pair in the signaling to transmit to the subscriber identity association module.

In step 5, the subscriber identity association module receives an S1-MME interface and S11 interface subscriber identity pair, performs an association to generate a complete subscriber identity table {IMSI, GUTI, downlink F-TEID, uplink F-TEID}, and provides the subscriber identity table for the S1-MME interface to query.

In step 6, a bill sending module receives the bill generated by the S1-MME interface signaling monitoring and analysis module and obtained after IMSI backfilling, and sends the bill to an upper-level system.

The monitoring system provided by the embodiment can also perform maintenance on the subscriber identity table according to the above-mentioned steps, including creation, update and deletion of records in the table.

Figure 6:
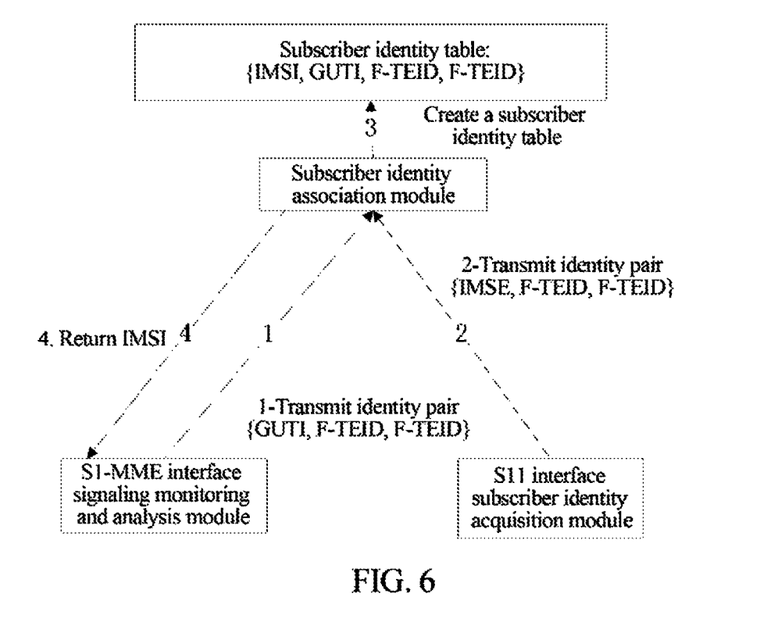
FIG. 6 illustrates a schematic diagram of cooperatively completing IMSI acquisition through all modules in a signaling monitoring system provided by embodiment 3 of the present disclosure.

As illustrated in FIG. 6, which illustrates a process of cooperatively completing IMSI acquisition through the S1-MME interface signaling monitoring and analysis module, the S11 interface subscriber identity acquisition module and the subscriber identity association module, the process includes the following processes:

In process 1, the S1-MME interface signaling monitoring and analysis module transmits an identity pair {GUTI, downlink F-TEID, uplink F-TEID} to the subscriber identity association module. Herein, there is no IMSI in the identity pair under most situations and identity pair information is transmitted to the subscriber identity association module.

In process 2, the S11 interface subscriber identity acquisition module transmits an identity pair {IMSI, downlink F-TEID, uplink F-TEID} to the subscriber identity association module.

In process 3, the subscriber identity association module associates the identity pairs transmitted by an S1-MME interface and an S11 interface by using a downlink F-TEID and an uplink F-TEID, and saves the identity pairs in a subscriber identity table.

In process 4, the S1-MME interface signaling monitoring and analysis module queries the subscriber identity table by using the GUTI or downlink F-TEID or uplink F-TEID information, and acquires the IMSI and backfills the IMSI into an S1-MME interface signaling bill.

Figure 7:
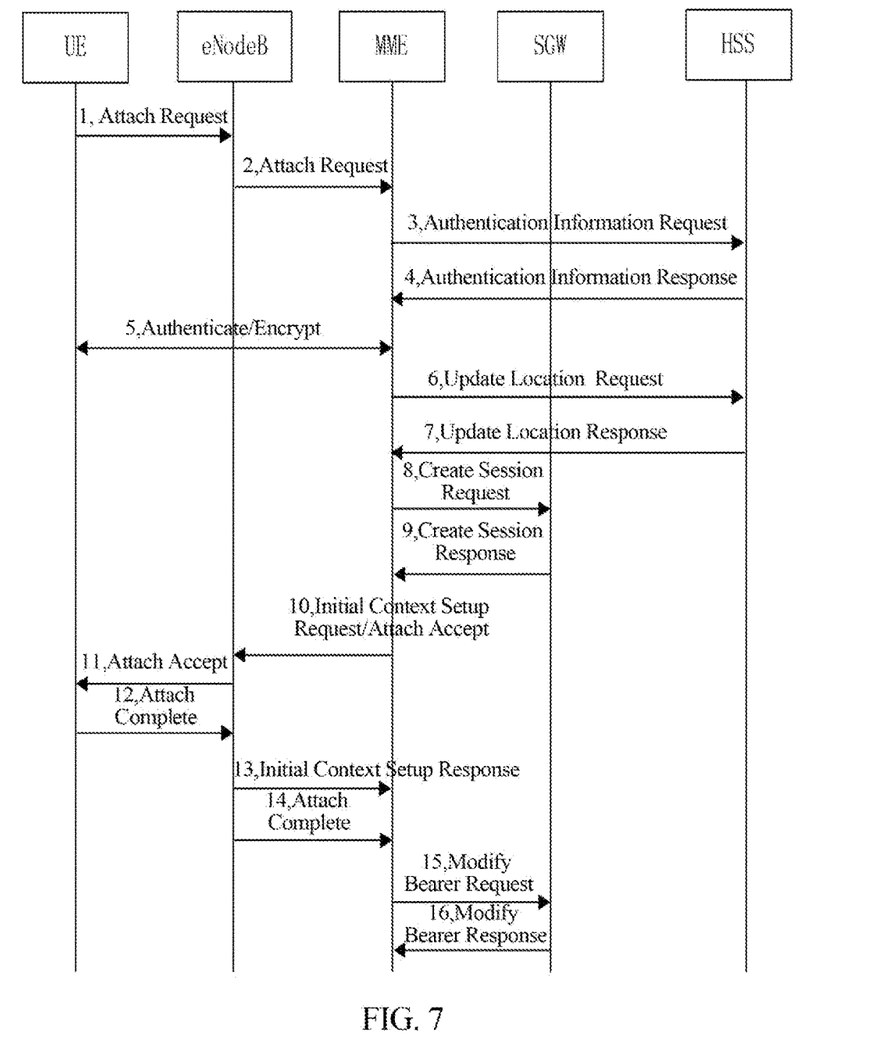
FIG. 7 illustrates a schematic diagram of an S1-MME and S11 interface signaling process in one attachment process provided by embodiment 3 of the present disclosure.

The signaling monitoring system provided by the embodiment will be introduced below through one subscriber attachment process. As illustrated in FIG. 7, the process includes the following processes:

In process 1, a user terminal starts network access and the terminal sends an Attach Request message to a base station to request for attachment.

In process 2, the base station eNodeB forwards the Attach Request message on an S1-MME interface to a core network device MME (Mobility Management Entity) to require for attachment, herein the message carries a GUTI and does not carry an IMSI under most situations.

In process 3, 4, 5, 6 and 7, the terminal, the base station eNodeB (evolved NodeB), the MME and an HSS (Home Subscriber Server) perform an attachment authentication and Update Location process.

In process 8, the MME sends a Create Session Request for a subscriber to be attached from an S11 interface to a Serving-GW (Gateway), herein the message carries an IMSI.

In process 9, the Serving-GW returns a Create Session Response message; herein the message carries an uplink F-TEID.

Figure 8:
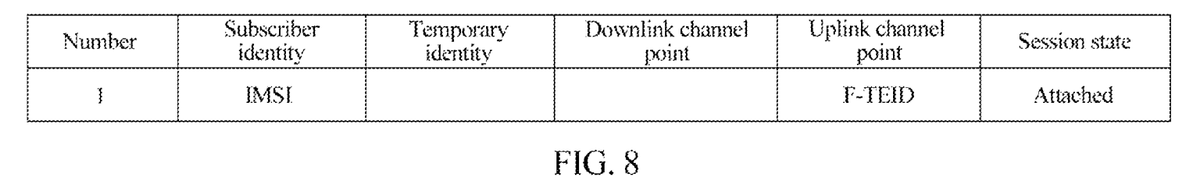
FIG. 8 illustrates a first type of subscriber identity table provided by embodiment 3 of the present disclosure.

On the S11 interface, an S11 interface subscriber identity acquisition module combines the Create Session Request message and the Create Session Response message to acquire a subscriber identity pair {IMSI, uplink F-TEID}, transmits the subscriber identity pair to a subscriber identity association module and generates a subscriber identity table as illustrated in FIG. 8.

In process 10, the MME returns an Attach Accept message from the S1-MME interface to the eNodeB, herein the message carries {uplink F-TEID}.

Figure 9:
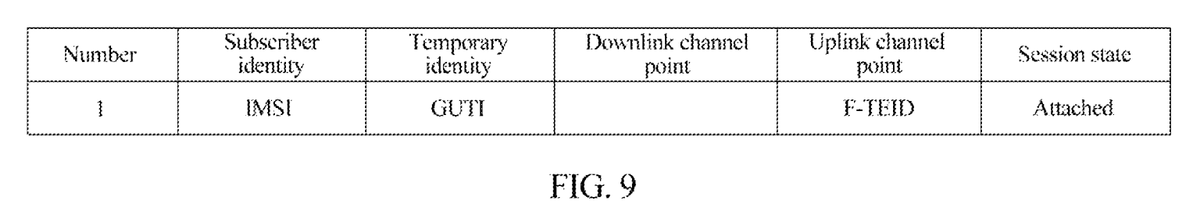
FIG. 9 illustrates a second type of subscriber identity table provided by embodiment 3 of the present disclosure.

On the S1-MME interface, the S1-MME interface signaling monitoring and analysis module combines the Attach Request into the Attach Accept message to acquire a subscriber identity pair {GUTI, uplink F-TEID}, and transmits the subscriber identity pair to the subscriber identity association module, generates a subscriber identity table as illustrated in FIG. 9, queries from the subscriber identity association module and returns a corresponding subscriber identity IMSI. The S1-MME interface signaling monitoring and analysis module performs parsing on the Attach Request message and the Attach Accept message to generate an attachment process bill, backfills the queried IMSI into the bill when the IMSI is queried, and sends the bill to a bill sending module.

In process 11, the eNodeB returns the Attach Accept message to the terminal.

In process 12, the terminal sends an Attach Complete message to the eNodeB.

In process 13, the eNodeB sends an Initial Context Setup Response message on the S1-MME interface to the MME, herein the message carries the downlink F-TEID.

Figure 10:
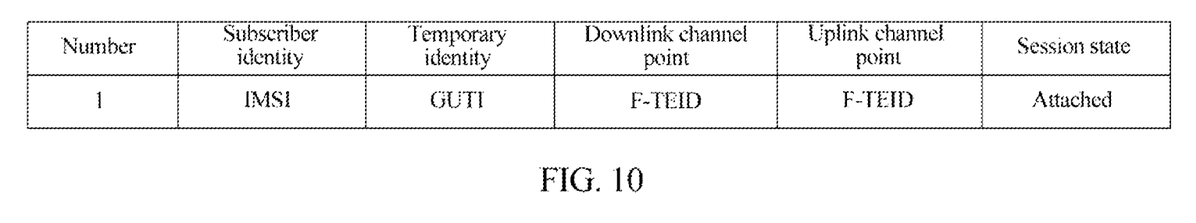
FIG. 10 illustrates a third type of subscriber identity table provided by embodiment 3 of the present disclosure.

The S1-MME interface signaling monitoring and analysis module transmits the identity pair {GUTI, downlink F-TEID, uplink F-TEID} in the process to the subscriber identity association module to form a complete subscriber identity table as illustrated in FIG. 10.

In process S14, the eNodeB returns the Attach Complete message to the MME.

In process 15 and 16, the MME sends a Modify Bearer Request message and receives a Modify Bearer Response message between on the S11 interface and the Serving-GW. The messages carry the downlink F-TEID. The S11 interface subscriber identity acquisition module transmits the identity pair {GUTI, downlink F-TEID, uplink F-TEID} in the process to the subscriber identity association module to form a complete subscriber identity table.

In a new signaling process which is subsequently initiated at the S1-MME interface, only the GUTI or the downlink F-TEID or the uplink F-TEID needs to be carried, the IMSI can always be queried in the subscriber identity table and the IMSI is backfilled into a signaling bill.

It should be understood that the signaling monitoring system provided by the embodiment is not limited to be applied to the subscriber attachment process only and may also be applied to other signaling processes; and the working principle of the signaling monitoring system provided by the embodiment is that association can be performed according to the GUTI, the downlink F-TEID and the uplink F-TEID carried by the S1-MME interface signaling and the IMSI, the downlink F-TEID and the uplink F-TEID carried by the S11 interface signaling to acquire the IMSI and backfill the IMSI into the S1-MME interface signaling bill. The S1-MME interface is not limited to be associated with the S11 interface only during actual application and may also be associated with the S10 interface, and the IMSI is acquired in an associated manner by using the GUTI.

One skilled in the art can understand that all or partial steps in the above-mentioned method may be completed by relevant hardware instructed by a program. The program may be stored in a computer readable storage medium such as a read-only memory, a magnetic disc or a compact disc or the like. In an exemplary embodiment, all or partial steps in the above-mentioned embodiments may also be implemented by using one or more integrated circuits. Correspondingly, each module/unit in the above-mentioned embodiments may be implemented by means of hardware and may also be implemented by means of a software function module. The embodiments of the present disclosure are not limited to combinations of hardware and software in any specific form.

INDUSTRIAL APPLICABILITY

By adopting the method provided by the embodiment of the present disclosure, the subscriber identity IMSI corresponding to the S1-MME interface signaling can be completely acquired, the IMSI can be provided for the signaling monitoring bill, thereby the signaling monitoring bill can be associated with the subscriber and the user experience is improved.

What is claimed is:

1. An International Mobile Subscriber Identity, IMSI, acquisition method, comprising the following steps:
    collecting an S1-MME interface signaling and a first interface signaling which is associated with the S1-MME interface signaling, wherein the S1-MME interface is associated with a first interface carrying the IMSI;
    acquiring a first identity from the S1-MME interface signaling, wherein the first identity comprises at least one of a Globally Unique Temporary User Equipment Identity, GUTI, and a third identity;
    acquiring an IMSI and a second identity from the first interface signaling, wherein the second identity and the third identity are a same S1-U bearer channel identity carried by the S1-MME interface signaling and the first interface signaling;
    associating the first identity, the second identity and the IMSI;
    acquiring a corresponding IMSI according to an association result and the first identity in the S1-MME interface signaling; and
    backfilling the acquired IMSI into bills such that bills of the S1-MME interface all have the IMSI and are directly associated to a subscriber.

2. The IMSI acquisition method according to claim 1, wherein the step of associating the first identity, the second identity and the IMSI comprises:
    associating the first identity, the second identity and the IMSI to generate a subscriber identity table; and
    the step of acquiring the corresponding IMSI according to an association result and the first identity in the S1-MME interface signaling comprises:
    querying the subscriber identity table according to the first identity in the S1-MME interface signaling to obtain the corresponding IMSI.

3. The IMSI acquisition method according to claim 1, wherein the first interface signaling which is associated with the S1-MME interface signaling comprises an S11 interface signaling; and the second identity and the third identity comprise at least one of uplink Full Qualified Tunnel Endpoint Identifier, F-TEID, and downlink F-TEID.

4. The IMSI acquisition method according to claim 1, wherein, when the first identity comprises the GUTI, the first identity and the second identity are a same GUTI carried by the S1-MME interface signaling and the first interface signaling.

5. The IMSI acquisition method according to claim 4, wherein the first interface signaling which is associated with the S1-MME interface signaling comprises an S10 interface signaling.

6. An International Mobile Subscriber Identity, IMSI, acquisition device, comprising a processor and a storage device, wherein the storage device stores processor-executable programs, and the processor-executable programs cause the processor to perform the steps in following modules: a collection module, a first acquisition module, a second acquisition module, a subscriber identity association module and an IMSI acquisition module, wherein:
    the collection module is arranged to collect an S1-MME interface signaling and a first interface signaling which is associated with the S1-MME interface signaling, wherein the S1-MME interface is associated with a first interface carrying the IMSI;
    the first acquisition module is arranged to acquire a first identity from the S1-MME interface signaling, wherein the first identity comprises at least one of a Globally Unique Temporary User Equipment Identity, GUTI, and a third identity;
    the second acquisition module is arranged to acquire an IMSI and a second identity from the first interface signaling, wherein the second identity and the third identity are a same S1-U bearer channel identity carried by the S1-MME interface signaling and the first interface signaling;
    the subscriber identity association module is arranged to associate the first identity, the second identity and the IMSI; and
    the IMSI acquisition module is arranged to acquire a corresponding IMSI according to an association result and the first identity in the S1-MME interface signaling, and backfill the acquired IMSI into bills such that bills of the S1-MME interface all have the IMSI and are directly associated to a subscriber.

7. The IMSI acquisition device according to claim 6, wherein the subscriber identity association module is arranged to associate the first identity, the second identity and the IMSI to generate a subscriber identity table; and
    the IMSI acquisition module is arranged to query the subscriber identity table according to the first identity in the S1-MME interface signaling to obtain the corresponding IMSI.

8. The IMSI acquisition device according to claim 6, wherein the first interface signaling which is associated with the S1-MME interface signaling comprises an S11 interface signaling; and the second identity and the third identity comprise at least one of uplink F-TEID and downlink F-TEID.

9. The IMSI acquisition device according to claim 6, wherein the first identity comprises the GUTI and the first interface signaling which is associated with the S1-MME interface signaling comprises an S10 interface signaling; and the second identity and the GUTI are a same GUTI carried by the S1-MME interface signaling and the first interface signaling.

10. A signaling monitoring system, comprising a processor and a storage device, wherein the storage device stores processor-executable programs, and the processor-executable programs cause the processor to perform the steps in following modules: a data access module, an interface protocol identification module, an S1-MME interface signaling monitoring and analysis module, a first interface subscriber identity acquisition module, a subscriber identity association module and a bill sending module, wherein:
    the data access module is arranged to collect an S1-MME interface data packet and a first interface data packet, wherein the first interface data packet is a data packet of a first interface which is associated with an S1-MME interface;
    the interface protocol identification module is arranged to process the collected data packets, send the S1-MME interface data packet to the S1-MME interface signaling monitoring and analysis module, and send the first interface data packet to the first interface subscriber identity acquisition module;
    the S1-MME interface signaling monitoring and analysis module is arranged to extract an S1-MME interface signaling from the S1-MME interface data packet and process the S1-MME interface signaling to generate an S1-MME interface signaling bill; acquire a first identity from the S1-MME interface signaling and send the first identity to the subscriber identity association module, wherein the S1-MME interface is associated with a first interface carrying an International Mobile Subscriber Identity, IMSI, and the first identity comprises at least one of a Globally Unique Temporary User Equipment Identity, GUTI, and a third identity; and acquire a corresponding IMSI according to an association result of the subscriber identity association module and the first identity in the S1-MME interface signaling, and backfill the IMSI into the S1-MME interface signaling bill;
    the first interface subscriber identity acquisition module is arranged to extract a first interface signaling from the first interface data packet and acquire an IMSI and a second identity from the first interface signaling and send the IMSI and the second identity to the subscriber identity association module, wherein the second identity and the third identity are a same S1-U bearer channel identity carried by the S1-MME interface signaling and the first interface signaling;
    the subscriber identity association module is arranged to associate the first identity, the second identity and the IMSI; and
    the bill sending module is arranged to send the backfilled S1-MME interface signaling bill to an upper-level system such that bills of the S1-MME interface all have the IMSI and are directly associated to a subscriber.

11. The signaling monitoring system according to claim 10, wherein the subscriber identity association module is arranged to associate the first identity, the second identity and the IMSI to generate a subscriber identity table; and
    the S1-MME interface signaling monitoring and analysis module is arranged to query the subscriber identity table according to the first identity in the S1-MME interface signaling to obtain the corresponding IMSI.

12. The signaling monitoring system according to claim 10, wherein the first interface signaling which is associated with the S1-MME interface signaling comprises an S11 interface signaling; and the second identity and the third identity comprise at least one of uplink F-TEID and downlink F-TEID.

* * * * *